United States Patent [19]

Turetsky

[11] 4,138,339

[45] * Feb. 6, 1979

[54] FILTER-PURIFIER CARTRIDGE HAVING SEPARABLE ELEMENTS

[76] Inventor: Isadore Turetsky, 23940 Welby Way, Canoga Park, Calif. 91307

[*] Notice: The portion of the term of this patent subsequent to Aug. 15, 1995, has been disclaimed.

[21] Appl. No.: 865,739

[22] Filed: Dec. 29, 1977

Related U.S. Application Data

[63] Continuation-in-part of Ser. No. 771,777, Feb. 24, 1977, Pat. No. 4,107,047.

[51] Int. Cl.² .................. B01D 27/08; B01D 29/26
[52] U.S. Cl. .................................... 210/337; 210/450
[58] Field of Search ............ 210/295, 315, 335, 337, 210/338, 339, 450, 458

[56] References Cited

U.S. PATENT DOCUMENTS

| | | | |
|---|---|---|---|
| 2,781,912 | 2/1957 | Newcum | 210/295 |
| 2,904,182 | 9/1959 | Baümann | 210/458 X |
| 3,132,501 | 5/1964 | Jacobs et al. | 210/335 X |
| 3,262,570 | 7/1966 | Gailitis et al. | 210/315 X |
| 3,300,051 | 1/1967 | Mitchell | 210/339 |
| 3,357,563 | 12/1967 | Sicard | 210/315 X |
| 3,467,256 | 9/1969 | Humbert, Jr. et al. | 210/338 X |

Primary Examiner—William A. Cuchlinski, Jr.

[57] ABSTRACT

A filter-purifier cartridge arranged so that a self contained tubular purifying element is inserted within the hollow core of a tubular filter; the inlet and outlet passages of the purifying element arranged to permit axial flow through the hollow core containing the purifying medium of said element, in combination with radial flow through the tubular filter.

7 Claims, 3 Drawing Figures

FILTER-PURIFIER CARTRIDGE HAVING SEPARABLE ELEMENTS

CROSS-REFERENCES TO RELATED APPLICATIONS

This application is a continuation-in-part of my prior application, Ser. No. 771777, filed Feb. 24, 1977 now U.S. Pat. No. 4,107,047, and entitled "A Filter-Purifier Cartridge Having Separable Elements"

FIELD OF THE INVENTION

This invention relates to a filter and purifier cartridge, and since it finds particular utility in the field of water filtration and purification, embodiments thereof adapted for such use are hereinafter described as illustrative of the invention and the advantages thereof, it being understood that my invention is not restricted to such use.

There is a growing demand for an inexpensive filter element that can be periodically discarded, and a relatively economical purifying element which can be used in combination with the aforementioned filter. Both the efficiency and filter life depend on the mass of purifying material used, and the surface area of the filter. The difficulty arises from the fact that in the present type of radial flow filter-purifier cartridges the fluid does not flow uniformly through the entire volume of the purifying medium, whereas in an axial flow filter-purifier cartridge the relatively small surface area used for filtration of the fluid decreases the life expectancy of the filter.

Objects of the Invention: An object of my invention is to provide a water filter-purifier cartridge consisting of separable purifier and filter elements which can be removed when purifying or filtering efficiency is impaired, and replaced accordingly.

Another object of my invention is the provision for recharging the purifier element with new purifying medium resulting in a marked savings as compared to a throw-away unit.

Still another object of my invention is to combine the efficiency offered by a radial flow through the filter with an axial flow within the purifier element.

An embodiment of my invention capable of accomplishing the foregoing objects and providing the advantages contemplated by them and other advantages is described in the following specification which may be more readily understood by reference to the accompanying drawings.

DETAILED DESCRIPTION OF THE DRAWINGS

Figure 1:
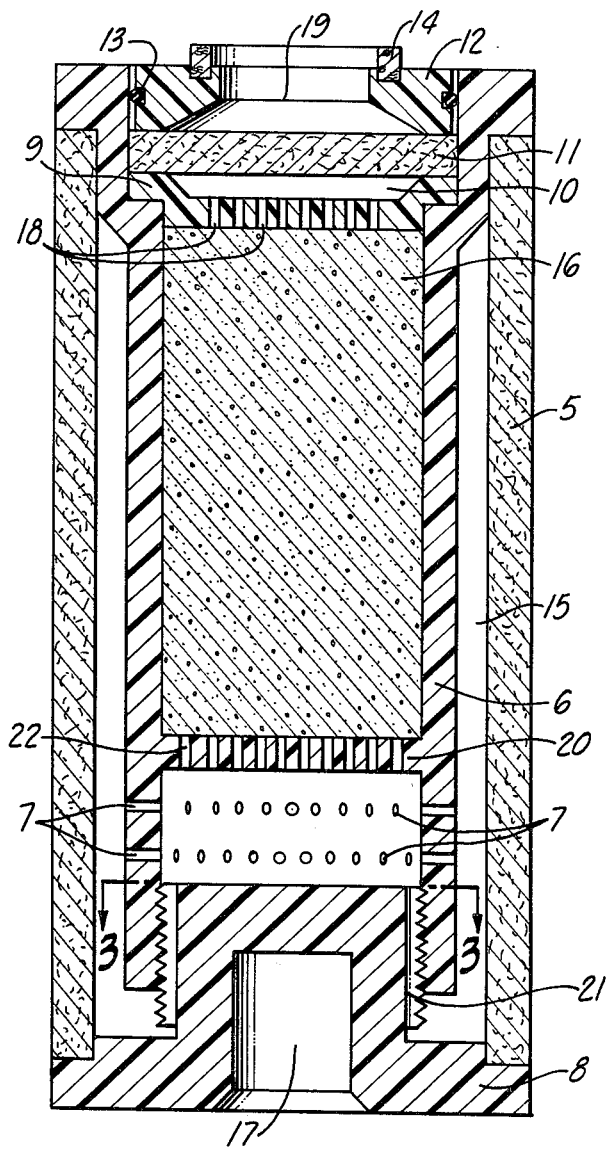
FIG. 1 is a side elevation sectional view of a filter-purifier cartridge embodying the invention.
Figure 2:
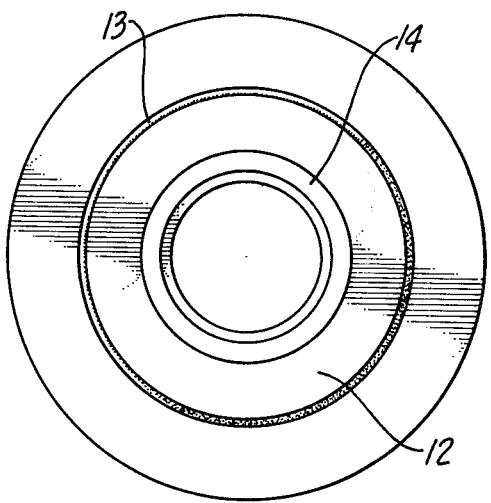
FIG. 2 is a plan view of the embodiment.
Figure 3:
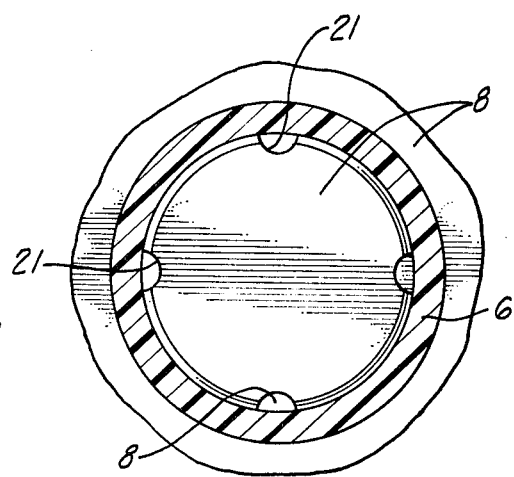
FIG. 3 is a horizontal cross-section of the hollow step-type threaded plug, the view being a section taken along the line 3—3 of FIG. 1.

Referring to FIG. 1 which is for illustrative purposes only, the numeral 5 indicates a permeable porous tubular filter having a hollow core, with one end of said tubular filter resting against the outside flange at the concentrically enlarged end section of hollow cylinder 6, said hollow cylinder 6 being inserted into the hollow core of the tubular filter 5. The unexpanded section of cylinder 6 is spaced from the sidewall of tubular filter 5 to form the annular space 15. An integrated partition 20 having a series of perforations 22 is located within the unexpanded section of cylinder 6, said partition 20 supports the purifying medium 16 contained within the hollow cylinder 6. The interior of cylinder 6 communicates with the annular space 15 by means of perforations 7 which are circumferentially disposed intermediate the unexpanded internally threaded end section of said hollow cylinder 6 and the perforated partition 20. The interior of hollow cylinder 6 also communicates with annular space 15 by means of axial channels 21 disposed around a partial section of the flanged hollow step-type threaded plug 8 which is screwed into the straight threaded end of hollow cylinder 6, said plug 8 positions the hollow cylinder 6, the tubular filter 5, and seals the adjacent end of said tubular filter 5. The threaded hollow step-type plug 8 will also transmit any axial compressive stress through the hollow cylinder 6 and the tubular filter 5. The circular recess 17 of the flanged hollow step-type plug 8 can be used to center the cartridge in its housing. The purifying medium 16 is contained within the hollow core of cylinder 6 by means of the perforated partition 20 and the perforated disk 9 which has an offset rimmed section resting against the shoulder within the enlarged interior section of the hollow cylinder 6. A permeable porous disk 11 rests against the offset rimmed section of the perforated disk 9 to form chamber 10. A cylinder sealing ring 12 containing an "O" ring 13 within a continuous groove in said sealing ring is inserted into the enlarged hollow core of the expanded section of cylinder 6 and rests against the permeable porous disk 11, the "O" ring seal 13 preventing any leakage between the outer wall of sealing ring 12 and the inner wall of enlarged section of cylinder 6. A ring gasket 14 is positioned atop sealing ring 12 and around the exit port 19 of the cartridge.

In operation the filter-purifier cartridge as shown is subjected to axial compression after said cartridge is inserted into its housing. The cartridge housing is not part of my invention and is not shown. It will be evident that, while the filter housing is not illustrated, one skilled in the art can easily adapt the illustrated cartridge to a hollow cylindrical housing having axially aligned inlet and outlet passages. One skilled in the art will also note that embodiments of the cartridge as shown, are adapted to a common type of filter housing which is screwed onto a double ported end section containing an "O" ring to seal the single open end of said housing.

With the filter-purifier cartridge assembled as illustrated, fluid to be filtered and purified flows radially through the permeable porous tubular filter 5 and enters the annular space 15. The fluid then enters the hollow core of cylinder 6 through the radial perforations 7 and the channels 21. The fluid then flows axially through the perforations 22 of partition 20 and continues flowing through the hollow core of cylinder 6 containing the purifying medium 16 and enters chamber 10 by means of perforations 18 in disk 9. The fluid then flows through the permeable porous disk 11 and exits at discharge port 19, said discharge port communicating with the discharge passage of the cartridge housing. The gasket 14 surrounding the cartridge discharge port 19 and the cartridge housing discharge passage prevents any unprocessed water from being discharged through said cartridge housing discharge passage.

The present invention contemplates an alternate embodiment which can include a reticulated core having a fiber winding as the tubular filter. Similarly, a perforated core being wound with fiber or having a pleated resin impregnated filter paper formed around said core can be used as a tubular filter.

While the embodiments of this invention hereinbefore illustrated and described are fully capable of performing the objects and accomplishing the advantages primarily stated, it will be understood that this invention is not restricted to the specific embodiments hereinbefore set forth, but includes all modifications coming within the scope of the claims that follow.

I claim:

1. A filter-purifier cartridge for liquids adapted to be inserted in a filter apparatus, comprising: a tubular purifier element containing a purifying medium supported by a perforated partition within its hollow core, said tubular element being concentrically enlarged at one end section, an internal shoulder within, an outlet passage, and an external flange at said enlarged end section; a perforated disk having an offset rimmed section being inserted and contained against said internal shoulder by a similarly inserted permeable porous disk and a sealing ring within the hollow core of said enlarged tubular section, and circumferentially disposed perforations at the opposite unexpanded internally threaded end section of said tubular purifier element; said tubular purifier element inserted into the hollow core of a tubular filter, one end of said tubular filter being sealed and positioned by the flange and enlarged circumferential end section of the tubular purifier element; the unexpanded section of said tubular purifier element being spaced from the sidewall of the tubular filter by means of a flanged, threaded, hollow step-type plug, a series of axial channels disposed around a section of said step-type plug, the threaded section of said step-type plug being inserted into the internally threaded end section of said tubular purifier element, the adjacent end of said tubular filter being sealed and positioned by the unthreaded section and flange of said hollow step-type plug, the purifying medium contained within the hollow core of said purifier element between the perforated disk resting against the internal shoulder of the expanded end section of said purifier element, and said perforated partition; said hollow core of the purifier element communicating with the annular space between the positioned tubular filter and said purifier element by means of the axial channels of said step-type plug and the circumferentially disposed perforations in said tubular purifier element.

2. The invention defined in claim 1, in which a frictional seal is disposed between the sealing ring and the enlarged end section of the tubular purifier element.

3. The invention defined in claim 1, in which the exposed end of the sealing ring contain a frictional seal surrounding the port of said sealing ring.

4. The invention defined in claim 1, wherein a chamber exists between the permeable porous disk and the perforated disk which are inserted in the enlarged tubular section of the purifier element.

5. The invention defined in claim 1, wherein the circumferentially disposed perforations at the unexpanded end section of the purifier element are located intermediate the perforated partition and threaded end section of said purifier element.

6. A filter-purifier cartridge for liquids having inlet and outlet means and adapted to be inserted in a filter apparatus, comprising: a separable purifier element containing purifying medium within its hollow core, said purifying medium confined between two foraminous members within said hollow core; said purifier element inserted into the hollow core of a pervious tubular filter element, one end of said purifier element being sealed and spaced from the side wall of the tubular filter element by means of an external flange and adjacent concentrically enlarged section at the upper end section of said purifier element, said concentrically enlarged section inserted into the hollow core of said tubular filter element forming an annular space between the smaller circumferential inserted section of said purifier element and the side wall of the tubular filter element; the lower end of said filter-purifier cartridge being sealed by a manually separable end closure which is joined to the lower end section of the purifier element and maintains the spaced relationship of said purifier element and the tubular filter element; said annular space communicates with the hollow core of the purifier element by means of passages disposed in a section of said removable end closure.

7. The invention defined in claim 6 in which the cartridge lower end closure is manually affixed to said purifier element.

* * * * *